(12) United States Patent
Terada

(10) Patent No.: US 6,264,237 B1
(45) Date of Patent: Jul. 24, 2001

(54) AIRBAG AND AIRBAG DEVICE

(75) Inventor: Masaki Terada, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/613,564

(22) Filed: Jul. 10, 2000

(30) Foreign Application Priority Data

Jul. 28, 1999 (JP) ................................. 11-213983

(51) Int. Cl.$^7$ ................................. B60R 21/16
(52) U.S. Cl. ................................. 280/743.1
(58) Field of Search ............... 280/743.1, 728.1, 280/731, 732

(56) References Cited

U.S. PATENT DOCUMENTS

| 5,865,466 | * | 2/1999 | Yamamoto et al. | 280/743.1 |
| 5,873,598 | * | 2/1999 | Yoshioka et al. | 280/732 |
| 5,979,937 | | 11/1999 | Yoshida et al. | |

FOREIGN PATENT DOCUMENTS

| 2536933 | * | 3/1976 | (DE) | 280/728.1 |
| 0 957 007 | | 5/1999 | (EP) . | |
| 0 945 309 | | 9/1999 | (EP) . | |
| 0 949 123 | | 10/1999 | (EP) . | |
| 0 997 352 | | 5/2000 | (EP) . | |
| 6-255437 | | 9/1994 | (JP) . | |

* cited by examiner

*Primary Examiner*—Eric Culbreth
(74) *Attorney, Agent, or Firm*—Kanesaka & Takeuchi (57) ABSTRACT

In a driver's airbag device, an inflator and a folded airbag are attached to a retainer, and covered by a module cover. The airbag is firstly folded in an elongated form in a lateral direction. In this case, a lower half is folded in a form of a roll, and an upper half is folded in a form of bellows. Then, the left and right half portions are folded in a form of a roll or bellows. Thus, without increasing an output of the inflator, the airbag folded as described above can be deployed to enter into a space between a lower side of a steering wheel and a driver.

6 Claims, 7 Drawing Sheets

AIRBAG AND AIRBAG DEVICE

BACKGROUND OF THE INVENTION AND RELATED ART STATEMENT

The present invention relates to an airbag to protect an occupant in case of a vehicle collision, and an airbag device using the same, especially, a driver's airbag device attached to a steering wheel. More particularly, the present invention relates to an airbag and an airbag device, wherein the airbag deploys to enter into a space between a lower portion of the steering wheel and the driver.

In an airbag device disposed at a fixed portion in front of a seat in a vehicle, in case of emergency, such as a vehicle collision, an airbag is rapidly inflated or deployed by a pressure of a gas spouted from a gas generator called an inflator, to thereby protect an occupant.

Figure 11:
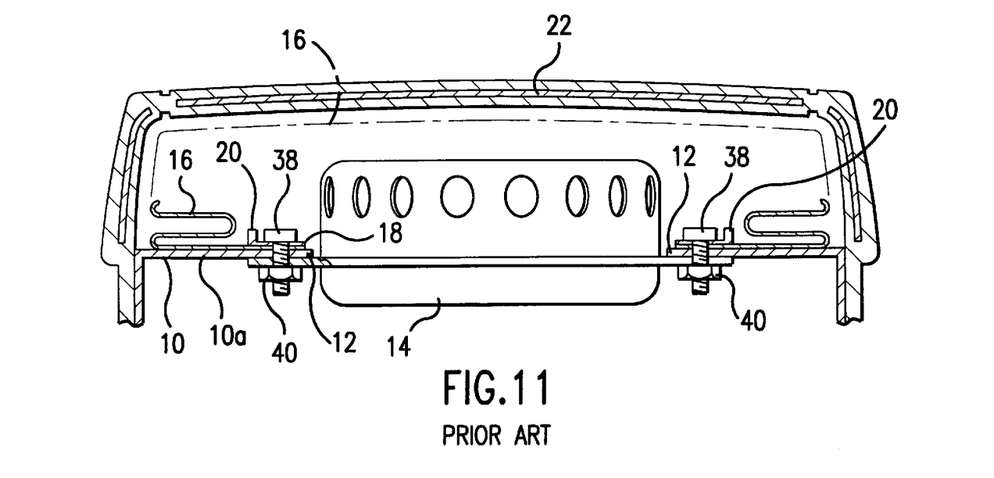
FIG. 11 is a sectional view of a conventional airbag device.

FIG. 11 shows an example of a conventional driver's airbag device. In an opening or inflator attachment opening 12 formed at a center of a main plate surface 10a of a retainer 10, a front side of an inflator 14 is fixed.

An airbag 16 includes a receiving hole 18 for receiving the front side of the inflator 14, and the receiving hole 18 is disposed at a rim portion of the attachment opening 12. The rim portion of the receiving hole 18 of the airbag is held between a holding ring or back plate 20 and the rim portion of the attachment opening 12.

Stud bolts 38 fixed to the holding ring 20 are inserted through bolt insertion holes of the airbag 16, bolt insertion holes of the retainer 10, and bolt insertion holes formed in a flange portion of the inflator 14, and then the stud bolts 38 are tightened by nuts 40. Accordingly, the airbag 16 and the inflator 14 are fixed to the retainer 10.

The airbag 16 is folded to be deployable, and covered by a module cover 22. The module cover 22 is torn and broken by an inflating pressure of the airbag 16 in case the airbag 16 is deployed by the generated or spouted gas from the inflator 14.

In general, in the airbag device for the driver's seat, it is preferable that the airbag 16 is rapidly inflated and deployed to a downward direction with respect to the driver when the inflator 14 is actuated. Conventionally, in order to achieve the above, the pressure of the generated gas from the inflator is increased, or a cloth for guiding the gas is disposed inside the airbag. However, these structures increase the manufacturing cost.

It is an object of the present invention to provide an airbag, which is folded such that the airbag deploys rapidly to a downward direction of the driver in case the inflator is actuated, to be located or interposed between the steering wheel and the driver, and an airbag device provided with such an airbag.

It is another object of the present invention to provide the airbag and the airbag device as stated above, wherein the pressure of the generated gas of the inflator need not be increased, and also a cloth for guiding the gas inside the airbag is eliminated.

Further objects and advantages of the invention will be apparent from the following description of the invention.

SUMMARY OF THE INVENTION

To achieve the above objects, the present invention provides an airbag which has an opening for receiving an inflator at a center of a rear surface thereof, wherein the airbag has a lower portion located at a lower side when an airbag device is attached to a steering wheel and folded in a form of a roll, and an upper portion located at an upper side when the airbag device is attached to the steering wheel and folded in a form of bellows.

It is preferable that the airbag in a flat form is folded into an elongated rectangular shape in the lateral direction, and a left half and a right half of the airbag in the elongated rectangular shape are respectively folded in a form of a roll or bellows.

An airbag device of the invention attached to a steering wheel of a vehicle is formed of: a retainer having an opening at a center of a main plate; an inflator having a front side inserted into the opening of the retainer to be attached to the retainer; an airbag, which has a hole for receiving the inflator at a rear side thereof and is attached to the retainer by attaching a rim portion of the hole to the retainer, the airbag being folded to deploy by a gas spouted from the inflator; and a module cover, which covers the airbag and is connected to the retainer. The airbag used in the above airbag device is attached to the steering wheel such that a half portion of the airbag is located at the lower side and the other half portion of the airbag is located at the upper side.

When the airbag is inflated by introducing the gas from the inflator into the airbag, since the lower side of the folded airbag is folded into the roll form, the lower side of the airbag is expanded while rolling downwardly, and the lower side of the airbag is inflated and interposed between the steering wheel and a driver.

The upper side of the airbag folded in the form of bellows is inflated faster than the roll form at the lower side thereof. In this case, on the way of inflating the airbag, the upper side of the airbag is inflated first so that the airbag has a shape tapering downwardly. Thus, the lower side of the airbag can smoothly enter into a narrow space between the steering wheel and the driver.

BRIEF DESCRIPTION OF THE DRAWINGS

FIGS. 1(a) and 1(b) are explanatory views of an airbag according to the present invention, wherein

FIGS. 2(a) and 2(b) are explanatory views for explaining a method of folding the airbag shown in FIGS. 1(a) and 1(b), wherein

FIGS. 3(a) and 3(b) are explanatory views for explaining the method of folding the airbag, wherein

DETAILED DESCRIPTION OF PREFERRED EMBODIMENTS

Figure 1A:
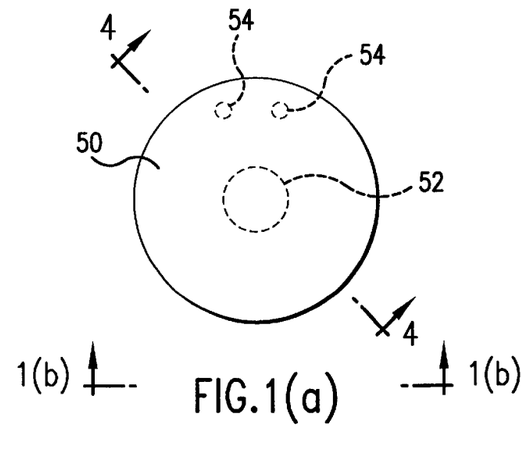
FIG. 1(a) is a plan view.
Figure 1B:
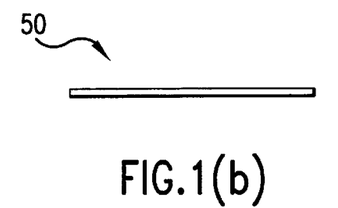
FIG. 1(b) is a side view taken along line 1(b)—1(b) in FIG. 1(a)
Figure 2A:
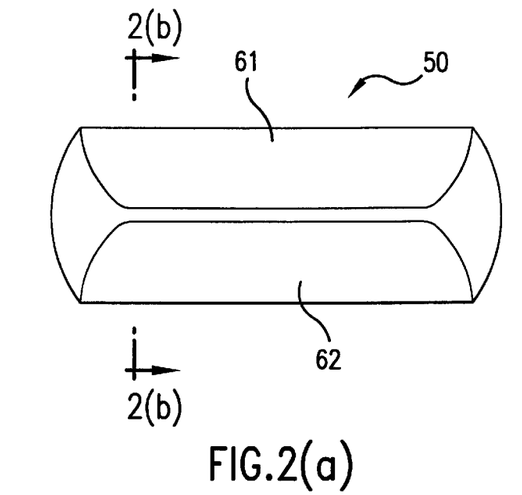
FIG. 2(a) is a plan view.
Figure 2B:
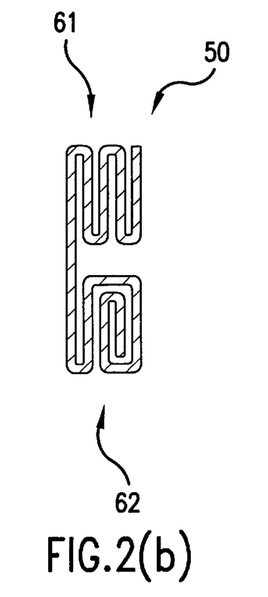
FIG. 2(b) is a sectional view taken along line 2(b)—2(b) in FIG. 2(a)
Figure 3A:
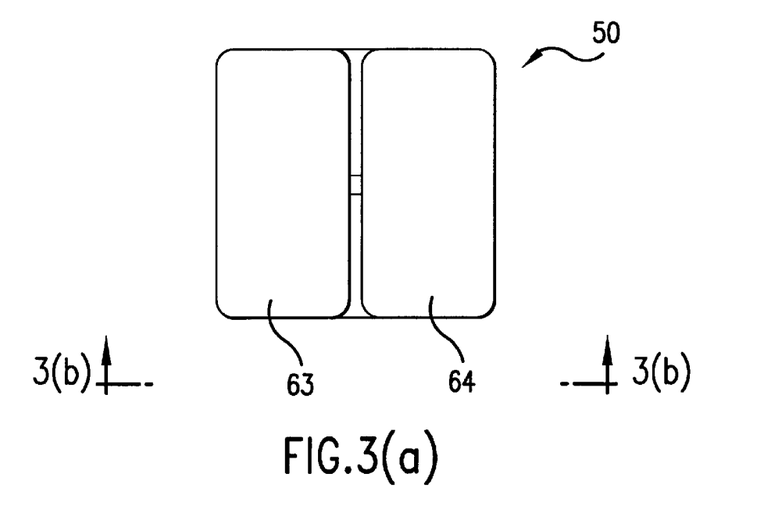
FIG. 3(a) is a plan view.
Figure 3B:
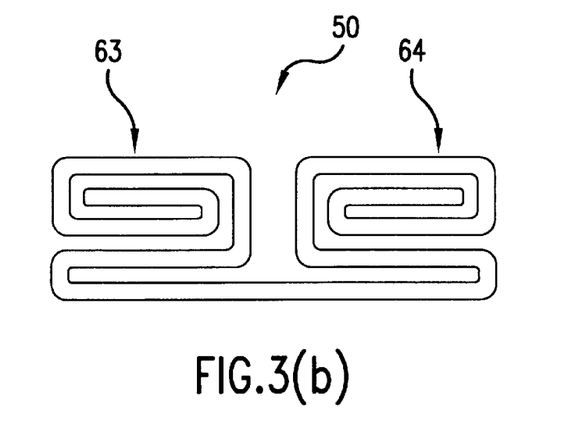
FIG. 3(b) is a side view taken along line 3(b)—3(b) in FIG. 3(a)
Figure 4:
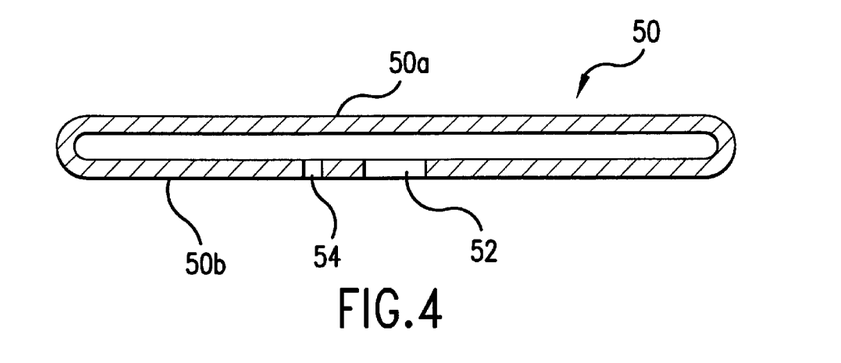
FIG. 4 is a cross sectional view taken along line 4—4 in FIG. 1(a)
Figure 5:
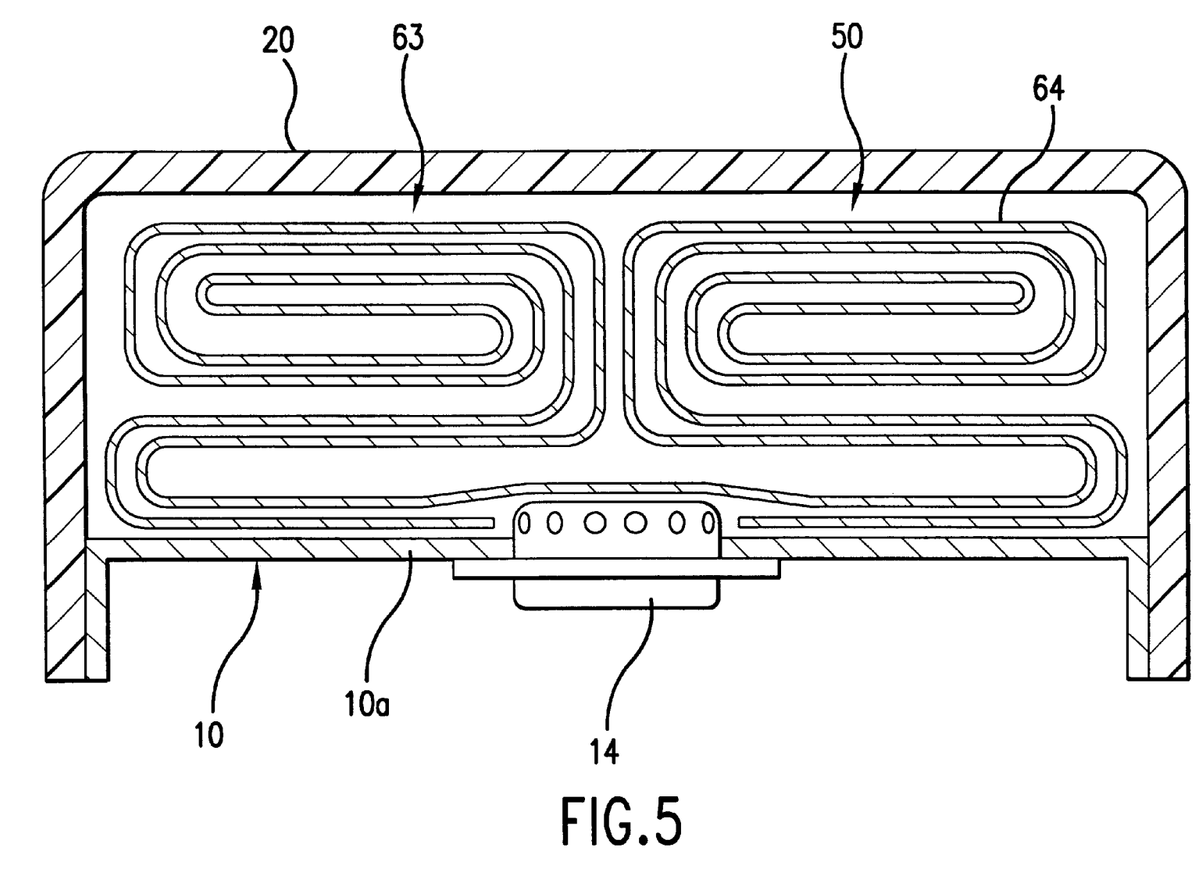
FIG. 5 is a vertical sectional view of an airbag device according to the embodiment of the present invention.
Figure 6:
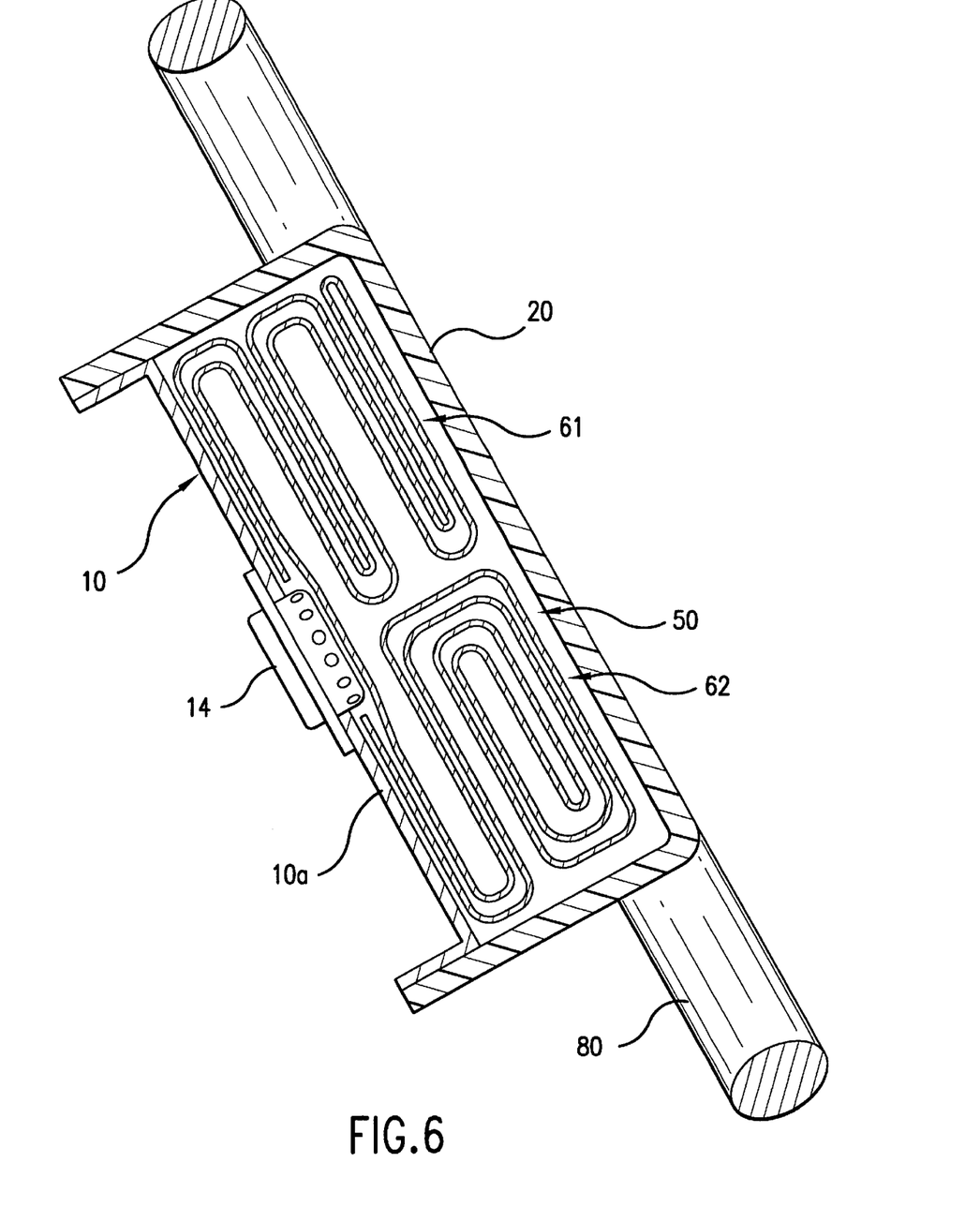
FIG. 6 is a sectional view of the airbag device according to the embodiment of the present invention.

Hereinafter, embodiments of the invention will be explained with reference to the accompanying drawings. FIG. 1(a) through FIG. 3(b) are explanatory views for explaining a method of folding an airbag of an airbag device according to an embodiment of the invention, wherein FIGS. 1(a), 2(a) and 3(a) are plan views of the airbag; and FIGS. 1(b), 2(b) and 3(b) are side and sectional views, respectively along line 1(b)—1(b) in FIG. 1(a), line 2(b)—2(b) in FIG. 2(b) and line 3(b)—3(b) in FIG. 3(a). FIG. 4 is a sectional view taken along line 4—4 in FIG. 1(a), and FIG. 5 is a schematic, vertical sectional view of the airbag device according to the embodiment of the invention, showing a section of the airbag device which is vertically cut in the right and left directions. FIG. 6 is a vertical sectional view in the up and down directions and in the front and rear directions of the vehicle, showing a condition that the airbag device is disposed at the steering wheel. Incidentally, in FIG. 6, the steering wheel is in a position of forwarding the vehicle straight.

As shown in FIGS. 5 and 6, the airbag device according to the embodiment of the invention has a structure such that an inflator 14 and an airbag 50 to be deployed by the inflator 14 are attached to a main plate 10a of a retainer 10, and the folded airbag 50 is covered by a module cover 20.

As shown in FIG. 4, the airbag 50 is formed by laminating a cloth constituting a front surface, that is, a front panel 50a, and a cloth constituting a rear surface, that is, a rear panel 50b, and then rim portions of the laminated panels are sewn by a sewing machine to have a bag form.

A center of the rear surface or rear panel 50b is provided with an opening 52 for receiving a front side of the inflator 14. Also, the airbag 50 is provided with two vent holes 54 formed relatively close to each other, which are provided for inhaling air when the airbag 50 is deployed, and for absorbing an impact by discharging a gas inside the airbag therethrough in case the driver hits or collides with the airbag after complete deployment of the airbag.

The airbag 50 has, in a condition that a gas is not blown therein, a flat and circular shape as shown in FIGS. 1(a), 1(b) and 4.

Next, a method of folding the airbag 50 will be explained with reference to FIG. 1(a) through FIG. 3(b).

At first, as shown in FIGS. 2(a) and 2(b), an upper half 61 and a lower half 62 of the airbag 50 are respectively folded several times to a center area of a front side along folding lines extending parallel to a line connecting two vent holes 54. In this case, the upper half 61 is folded into a form of bellows as shown in FIG. 2(b). The lower half 62 is folded in a form of a roll.

As described above, the airbag 50 is folded to have an elongated rectangular shape in the right and left directions or lateral direction. Thereafter, as shown in FIGS. 3(a) and 3(b), a left half 63 and a right half 64 of the airbag 50 are respectively folded in a form of a roll to thereby constitute the folded airbag 50. Incidentally, the left half 63 and the right half 64 can be folded in a form of bellows, but it is preferable that the left half 63 and the right half 64 are folded in the same folding forms.

The airbag 50 is folded as described above after the airbag 50 is attached to the retainer 10. The airbag 50 folded as described above is covered by the module cover 20, and the module cover 20 is connected to the retainer 10, so that the airbag device shown in FIGS. 5 and 6 is formed.

The airbag device is disposed at a substantially center of a steering wheel 80 as shown in FIG. 6. In this case, the airbag device is disposed such that the folded form of the lower half 62 of the airbag is located at a lower side, and the folded form of the upper half 61 is located at an upper side.

Figure 7A:
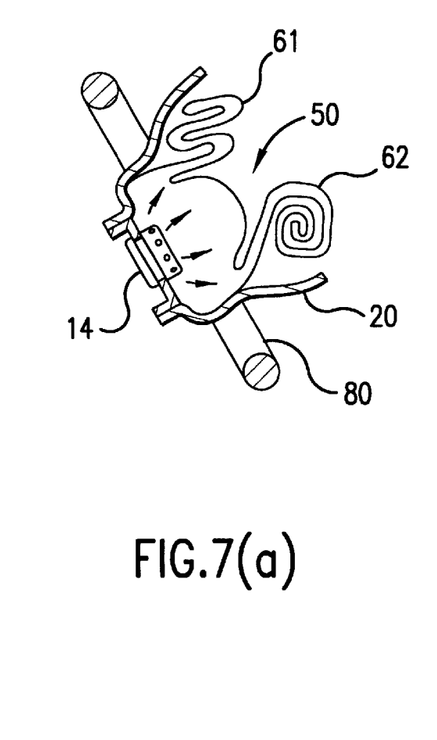
FIGS. 7(a) through 7(c) are explanatory vertical sectional views showing inflating conditions of the airbag of the airbag device.
Figures 7B, 7C:
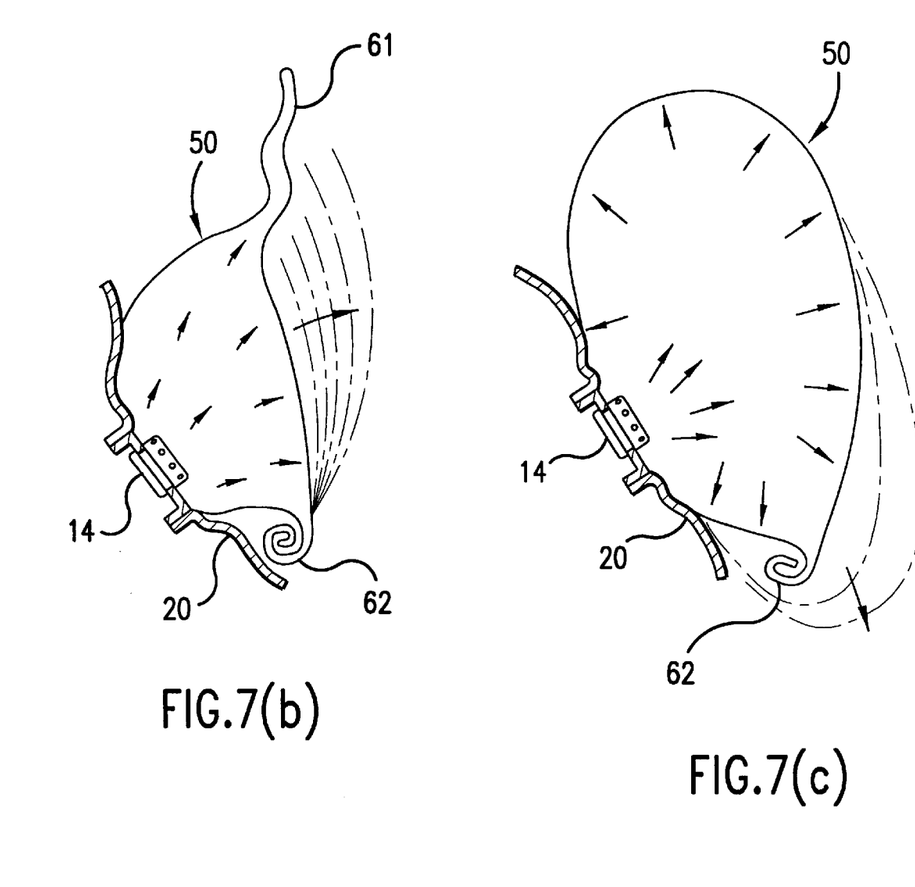
Figure 8:
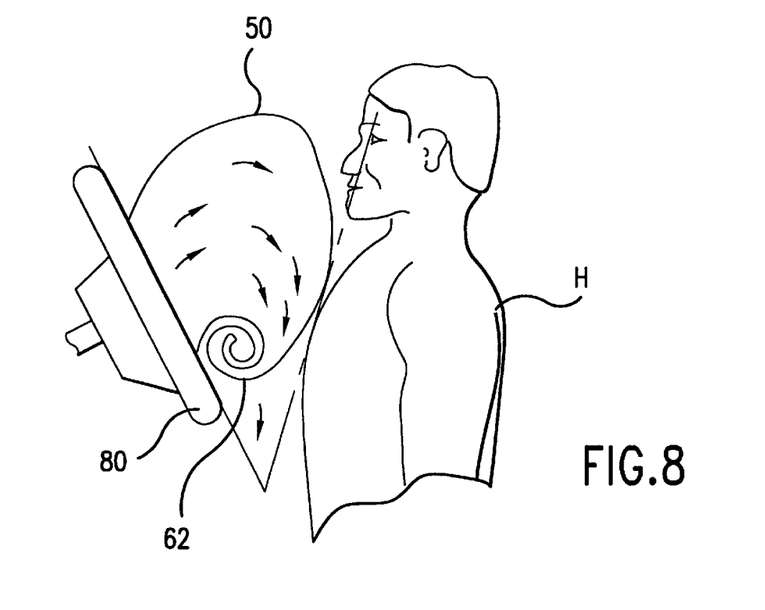
FIG. 8 is an explanatory vertical sectional view showing an inflating condition of the airbag of the airbag device.
Figure 9A:
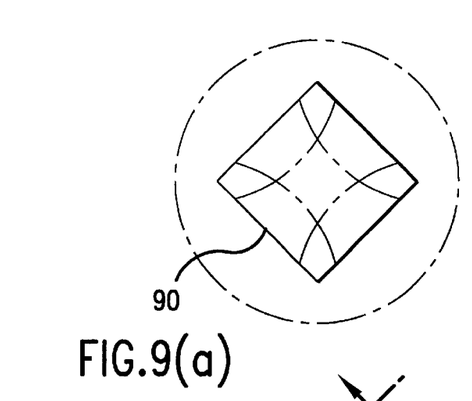
FIGS. 9(a) through 9(c) are explanatory views for explaining another method of folding the airbag.
Figure 9B:
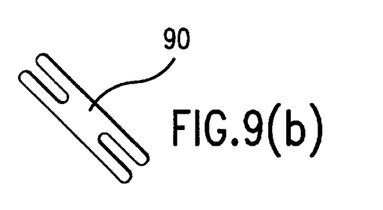
Figure 9C:
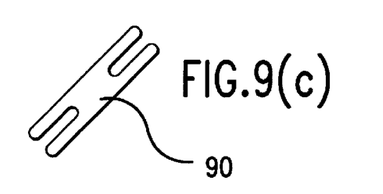
Figures 10A, 10B, 10C:
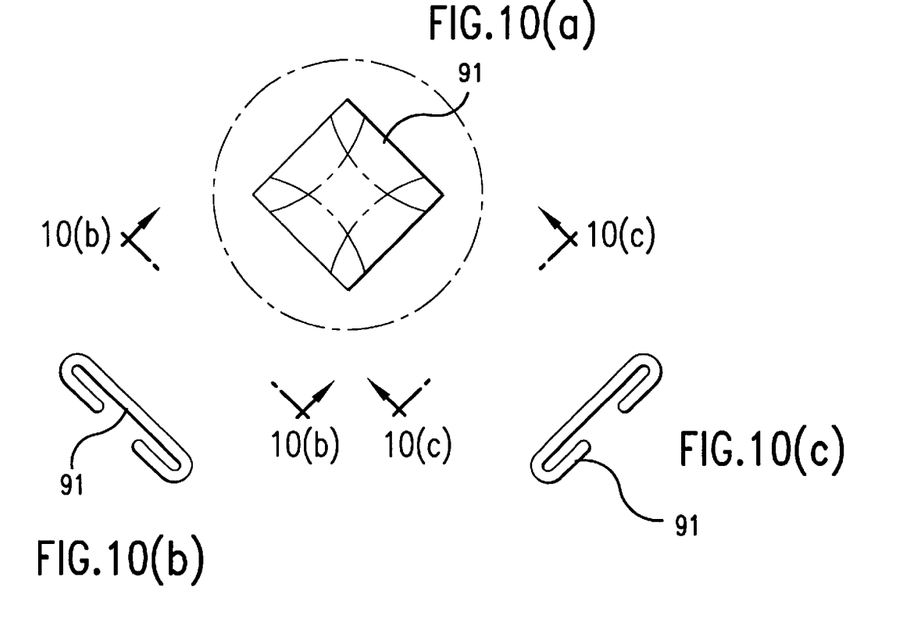
FIGS. 10(a) through 10(c) are explanatory views for explaining a still further method of folding the airbag.

In the airbag device structured as described above, when a gas is introduced into the airbag 50, the upper half 61 folded in bellows is inflated more easily than the lower half 62 folded in the roll form. Therefore, when the inflator 14 is actuated, as shown in FIG. 7(a), the module cover 20 is torn to open, and after the left half 63 and the right half 64 are inflated to the certain degree, the upper half 61 folded in bellows is greatly inflated first, and then the lower half 62 folded in the roll form is inflated. In the condition that the upper half 61 is inflated first as shown in FIG. 7(b), the airbag 50 has a shape that a lower portion of the airbag 50 is smaller or tapered as compared to the upper portion thereof. Then, as shown in FIGS. 7(c) and 8, the lower half 62 is inflated to enter into a narrow space between a lower side of the steering wheel 80 and a driver or occupant H. Accordingly, without providing a cloth for guiding a gas inside the airbag, it is possible to inflate the airbag 50 between the lower side of the steering wheel 80 and the occupant H.

According to the present invention, before forming the elongated rectangular member shown in FIG. 2(a), as shown in FIGS. 9(a) through 9(c) or FIGS. 10(a) through 10(c), the periphery of the airbag 50 may be folded inside at four sides thereof to form a square form 90 or 91. Then, the square form 90 or 91 is folded into the elongated rectangular shape.

As described above, according to the airbag and the airbag device of the invention, the airbag can deploy such that a part of the air bag can enter into a space between the lower side of the steering wheel and the driver. In the present invention, without increasing an output of the inflator, and without providing a cloth for guiding a gas inside the airbag, the airbag can be rapidly and sufficiently deployed between the lower side of the steering wheel and the driver.

While the invention has been explained with reference to the specific embodiments of the invention, the explanation is illustrative and the invention is limited only by the appended claims.

What is claimed is:

1. An airbag for a driver to be attached to a steering wheel comprising:
   an elongated center area extending laterally in a middle of the airbag,
   a lower portion located at a lower side of the center area, said lower portion being folded in a form of a roll and placed on the center area,
   an upper portion located at an upper side of the center area, said upper portion being folded in a form of bellows and placed on the center area without overlapping the folded lower portion, said folded upper and lower portions with the center area having an elongated rectangular form extending in a lateral direction, and
   a left portion, a center portion and a right portion formed in the elongated rectangular form, said left and right portions being respectively folded onto the center portion in a form of bellows or a roll without overlapping each other so that when the airbag is inflated, after the right and left portions are inflated, the upper portion and lower portions are inflated wherein the upper portion opens faster than the lower portion.

2. An airbag according to claim 1, wherein said airbag is formed of a front panel and a rear panel with an opening for receiving an inflator therein, said right and left portions being located above the opening.

3. An airbag according to claim 1, wherein said lower portion is rolled inwardly so that an outer surface facing an occupant gradually unrolls from a side opposite to the outer surface.

4. An airbag according to claim 1, wherein said airbag has a circular shape in a flat form, said circular shape being folded into a rectangular shape with four corners such that two corners extending in a diagonal direction orient in the lateral direction and other two corners extending in a diagonal direction orient in a direction perpendicular to the lateral direction before the upper and lower portions are folded.

5. An airbag device attached to a steering wheel of an automobile, comprising:

a retainer having a main plate portion and an opening formed in the main plate portion,     an inflator having a front end and attached to the retainer such the front end is located in the opening of the retainer,     an airbag having a hole at a rear surface thereof for receiving the inflator therein and attached to the retainer at a rim of the hole, said airbag being folded to be deployable by a gas spouted from the inflator and including an elongated center area extending laterally in a middle of the airbag; a lower portion located at a lower side of the center area, said lower portion being folded in a form of a roll and placed on the center area; an upper portion located at an upper side of the center area, said upper portion being folded in a form of bellows and placed on the center area without overlapping the folded lower portion, said folded upper and lower portions with the center area having an elongated rectangular form extending in a lateral direction; and a left portion, a center portion and a right portion formed in the elongated rectangular form, said left and right portions being respectively folded onto the center portion in a form of bellows or a roll without overlapping each other so that when the airbag is inflated, after the right and left portions are inflated, the upper and lower portions are inflated wherein the upper portion opens faster than the lower portion, and     a module cover connected to the retainer to cover the airbag.

6. An airbag device according to claim 5, wherein said upper and lower portions are inflated simultaneously by a gas supplied from the inflator through the hole.

\* \* \* \* \*